US012656007B2

(12) United States Patent
Chen et al.

(10) Patent No.: US 12,656,007 B2
(45) Date of Patent: Jun. 16, 2026

(54) BUILDING CONTROLLER WITH ANTENNA

(71) Applicant: Honeywell International Inc., Charlotte, NC (US)

(72) Inventors: Chao Chen, Charlotte, NC (US); Baofeng Dong, Charlotte, NC (US); Ke Wei Han, Charlotte, NC (US); Eason Zhu, Charlotte, NC (US); Hua Tang, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 308 days.

(21) Appl. No.: 18/248,200

(22) PCT Filed: Oct. 14, 2020

(86) PCT No.: PCT/CN2020/120882
§ 371 (c)(1),
(2) Date: Apr. 6, 2023

(87) PCT Pub. No.: WO2022/077263
PCT Pub. Date: Apr. 21, 2022

(65) Prior Publication Data

US 2023/0383979 A1 Nov. 30, 2023

(51) Int. Cl.
*F24F 11/89* (2018.01)
*F24D 19/10* (2006.01)
(Continued)

(52) U.S. Cl.
CPC .............. *F24F 11/56* (2018.01); *F24D 19/10* (2013.01); *F24F 11/52* (2018.01); *F24F 11/89* (2018.01); *H01Q 1/22* (2013.01)

(58) Field of Classification Search
CPC .......... F24F 11/523; F24F 11/56; F24F 11/58; F24F 11/50; F24F 11/52; F24F 11/89;
(Continued)

(56) References Cited

U.S. PATENT DOCUMENTS 6,100,850 A * 8/2000 Utsumi .................... H01Q 1/22 343/702
8,289,226 B2 10/2012 Takach et al.
(Continued)

FOREIGN PATENT DOCUMENTS

CN 1663901 A 9/2005
CN 107109892 A 8/2017

*Primary Examiner* — Jerry-Daryl Fletcher
*Assistant Examiner* — Daniel C Comings
(74) *Attorney, Agent, or Firm* — Seager, Tufte & Wickhem, LLP

(57) ABSTRACT

A wall module for a building control system includes a back plate with one or more mounting features for mounting the backplate to a wall. A main body includes one or more attachment features for removably attaching the main body to the back plate. The main body also includes a front side and a back side, wherein at least part of the front side is formed by a front plate. A display is housed by the main body in a display cavity that is defined at least in part by the front plate, and wherein at least part of the display is viewable from the front side. An antenna is housed by the main body in an antenna cavity that is defined at least in part by the front plate.

18 Claims, 10 Drawing Sheets

(51) Int. Cl.

| | |
|---|---|
| ***F24F 11/52*** | (2018.01) |
| ***F24F 11/56*** | (2018.01) |
| ***H01Q 1/22*** | (2006.01) |

(58) Field of Classification Search

CPC ............ H01Q 1/007; H01Q 1/22; H01Q 1/52; H01Q 1/221

See application file for complete search history.

(56) References Cited

U.S. PATENT DOCUMENTS

| | | | | |
|---|---|---|---|---|
| 9,964,326 | B2 | 5/2018 | Khoury et al. | |
| 10,082,312 | B2 | 9/2018 | Vozenilek et al. | |
| 2014/0080411 | A1 | 3/2014 | Konanur et al. | |
| 2014/0243052 | A1 | 8/2014 | Hobson et al. | |
| 2015/0267936 | A1 | 9/2015 | Wright et al. | |
| 2015/0331451 | A1 | 11/2015 | Shin et al. | |
| 2016/0234362 | A1 | 8/2016 | Moon et al. | |
| 2017/0214132 | A1 | 7/2017 | Jeon | |
| 2017/0309992 | A1 | 10/2017 | Noori et al. | |
| 2017/0324167 | A1* | 11/2017 | Ng | H01Q 1/38 |
| 2018/0026341 | A1 | 1/2018 | Mow et al. | |
| 2019/0312334 | A1 | 10/2019 | Shin et al. | |
| 2019/0372213 | A1* | 12/2019 | Hashimoto | H04Q 9/00 |

* cited by examiner

BUILDING CONTROLLER WITH ANTENNA

TECHNICAL FIELD

The present disclosure pertains to building control systems. More particularly, the present disclosure pertains to a building controller that is configured to communicate over a wireless network.

BACKGROUND

Building control systems are used to control systems of a building, and often include one or more building controllers that control one or more building control components. Such building control systems can include Heating, Ventilation and/or Air Conditioning (HVAC) systems, building security systems, building lighting control systems and/or any other suitable building control system. In many instances, a building control system includes a building controller that communicates wirelessly with one or more other components. The building controller may, for example, communicate wirelessly with one or more remote sensors, one or more other building system components, a gateway, and/or a mobile device of a user. In some cases, the building controller may communicate wirelessly with remote or cloud-based servers that are remote from the building controller, sometimes through a gateway. There is a desire for improved building controllers that are configured to communicate wirelessly without unnecessarily increasing the size of the building controller.

SUMMARY

The present disclosure relates to a building controller that is configured to wireless communication. In an example, the building controller is a wall module that includes a back plate with one or more mounting features for mounting the backplate to a wall. A main body includes one or more attachment features for removably attaching the main body to the back plate. The main body also includes a front side and a back side, wherein at least part of the front side is formed by a front plate. A display is housed by the main body in a display cavity that is defined at least in part by the front plate, and wherein at least part of the display is viewable from the front side of the main body (e.g. through the front plate or through an opening in the front plate). An antenna for wireless communication is housed by the main body in an antenna cavity that is defined at least in part by the front plate.

In another example, a wall module for a building control system includes a main body having a front side and a back side, wherein at least part of the front side is formed by a front plate. A printed circuit board (PCB) is housed by the main body. A display is housed by the main body, and at least part of the display is viewable from the front side. An antenna is housed by the main body and includes a flexible printed circuit (FPC) that is positioned behind the front plate and in front of the PCB. A display holder is situated between the PCB and the front plate, and includes a display recess that receives at least part of the display to position the display relative to the PCB and an antenna recess for receiving at least part of the FPC of the antenna to position the FPC of the antenna behind the front plate.

In another example, a wall mountable thermostat includes a main body having a front side, a back side and one or more side walls that extend between the front side and the back side. A printed circuit board (PCB) is housed by the main body. A display is housed by the main body, where at least part of the display is viewable from the front side of the main body. An antenna is housed by the main body. The antenna is spaced from the PCB toward the front of the wall mountable thermostat and is electrically connected to the PCB. The antenna is spaced inward from each of the one or more side walls of the main body and is spaced laterally from the display.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

Figure 1:
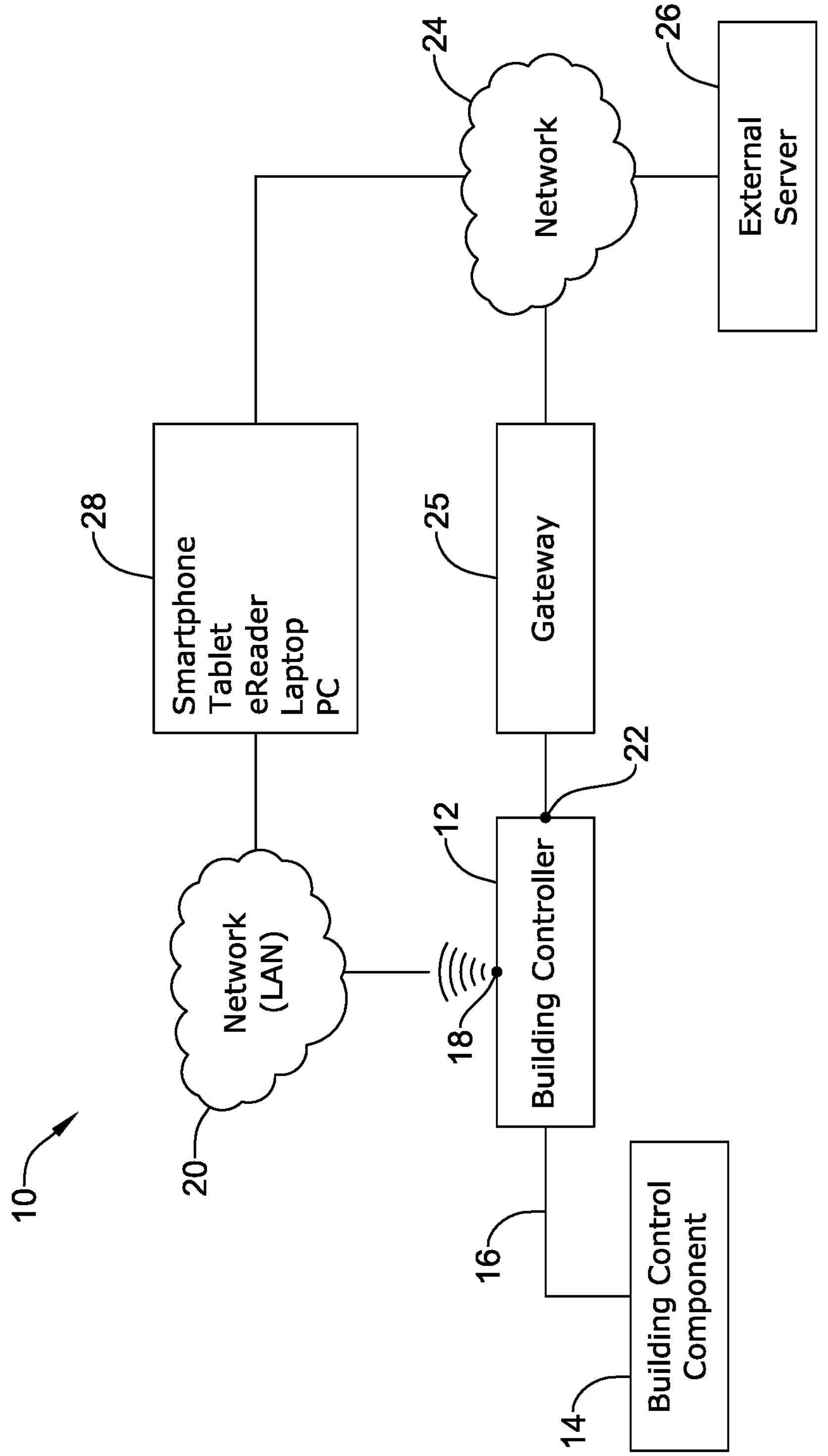
FIG. 1 is a schematic view of an illustrative building control system.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term “about”, unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms “a”, “an”, and “the” include the plural referents unless the content clearly dictates otherwise. As used in this specification and the appended claims, the term “or” is generally employed in its sense including “and/or” unless the content clearly dictates otherwise.

It is noted that references in the specification to “an embodiment”, “some embodiments”, “other embodiments”, etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

The present disclosure is directed generally at building control systems. Building control systems are systems that control one or more operations of a building. Building control systems can include HVAC systems, security systems, fire suppression systems, energy management systems, and other systems. While HVAC systems with HVAC controllers are used as an example below, it should be recognized that the concepts disclosed herein can be applied to building control systems more generally.

FIG. 1 is a schematic view of an illustrative building control system 10. The system 10 includes a building controller 12 that may be configured to control operation of at least some functions of a building control component 14. In some cases, the building control component 14 may be an HVAC system, and the building controller 12 may represent an HVAC controller such as but not limited to a thermostat. This is merely illustrative. The building controller 12 may be configured to communicate with various components of the building control component 14 via a wired link 16. In some cases, it is contemplated that the building controller 12 may communicate with various components of the building control component 14 via a wireless connection. Additionally, the building controller 12 may communicate over one or more wired or wireless networks that may accommodate remote access and/or control of the building control component 14 via another device such as a smart phone, tablet, e-reader, laptop computer, personal computer, key fob, or the like. In some cases, the building controller 12 may include a first communications port 18 for communicating over a first network 20, and in some cases, a second communications port 22 for communicating over a second network 24. In some cases, the first network 20 may be a wireless local area network (WLAN), and the second network 24 (when provided) may be a wide area network or global network (WAN) including, for example, the Internet. In some cases, a gateway 25 may be disposed between the building controller 12 and the second network 24. In some cases, the wireless local area network 20 may provide a wireless access point and/or a network host device that is separate from the building controller 12. In other cases, the wireless local area network 20 may provide a wireless access point and/or a network host device that is part of the building controller 12. In some cases, the wireless local area network 20 may include a local domain name server (DNS), but this is not required for all embodiments. In some cases, the wireless local area network 20 may be an ad-hoc wireless network, but this is not required.

In some cases, the building controller 12 may be programmed to communicate over the second network 24 with an external web service hosted by one or more external web server(s) 26. A non-limiting example of such an external web service is Honeywell’s TOTAL CONNECT™ web service. The building controller 12 may be configured to upload selected data via the second network 24 to the external web service where it may be collected and stored on the external web server 26. In some cases, the data may be indicative of the performance of the building control component 14. Additionally, the building controller 12 may be configured to receive and/or download selected data, settings and/or services sometimes including software updates from the external web service over the second network 24. The data, settings and/or services may be received automatically from the web service, downloaded periodically in accordance with a control algorithm, and/or downloaded in response to a user request. In some cases, for example, when the building controller 12 represents an HVAC controller, the HVAC controller may be configured to receive and/or download an HVAC operating schedule and operating parameter settings such as, for example, temperature set points, humidity set points, start times, end times, schedules, window frost protection settings, and/or the like from the web server 26 over the second network 24. In some instances, the HVAC controller may be configured to receive one or more user profiles having at least one operational parameter setting that is selected by and reflective of a user’s preferences. In still other instances, the HVAC controller may be configured to receive local weather data, weather alerts and/or warnings, major stock index ticker data, traffic data, and/or news headlines over the second network 24. These are just some examples.

Depending upon the application and/or where the user is located, remote access and/or control of the building controller 12 may be provided over the first network 20 and/or the second network 24. A variety of remote wireless devices 28 may be used to access and/or control the building controller 12 from a remote location (e.g., remote from the building controller 12) over the first network 20 and/or the second network 24 including, but not limited to, mobile phones including smart phones, tablet computers, laptop or personal computers, wireless network-enabled key fobs, e-readers, and/or the like. In many cases, the remote wireless devices 28 are configured to communicate wirelessly over the first network 20 and/or second network 24 with the building controller 12 via one or more wireless communication protocols including, but not limited to, cellular communication, ZigBee, REDLINK™, Bluetooth, WiFi, IrDA, dedicated short range communication (DSRC), EnOcean, and/or any other suitable common or proprietary wireless protocol, as desired.

In some cases, an application program code (i.e., app) stored in the memory of the remote device 28 may be used to remotely access and/or control the building controller 12. The application program code (app) may be downloaded from an external web service, such as the web service hosted by the external web server 26 (e.g., Honeywell’s TOTAL CONNECT™ web service) or another external web service (e.g., ITUNES® or Google Play). In some cases, the app may provide a remote user interface for interacting with the building controller 12 at the user’s remote device 28. For example, if the building controller 12 represents an HVAC controller, a user may be able to change operating parameter settings such as, for example, temperature set points, humidity set points, start times, end times, schedules, window frost protection settings, accepts software updates and/or the like using the user interface provided by the app. Communications may be routed from the user’s remote device 28 to the web server 26 and then, from the web server 26 to the building controller 12. In some cases, communications may flow in the opposite direction such as, for example, when a user interacts directly with the building controller 12 to change an operating parameter setting such as, for example, a schedule change or a set point change. The change made at the building controller 12 may be routed to the web server 26 and then from the web server 26 to the remote device 28 where it may be reflected by the application program executed by the remote device 28.

In some cases, a user may be able to interact with the building controller 12 via a user interface provided by one or more web pages served up by the web server 26. The user may interact with the one or more web pages using a variety of internet capable devices to affect a setting or other change at the building controller 12, and in some cases view usage data and energy consumption data related to the usage of the building control component 14. In some cases, communication may occur between the user's remote device 28 and the building controller 12 without being relayed through a server such as external server 26. These are just some examples.

Figure 2:
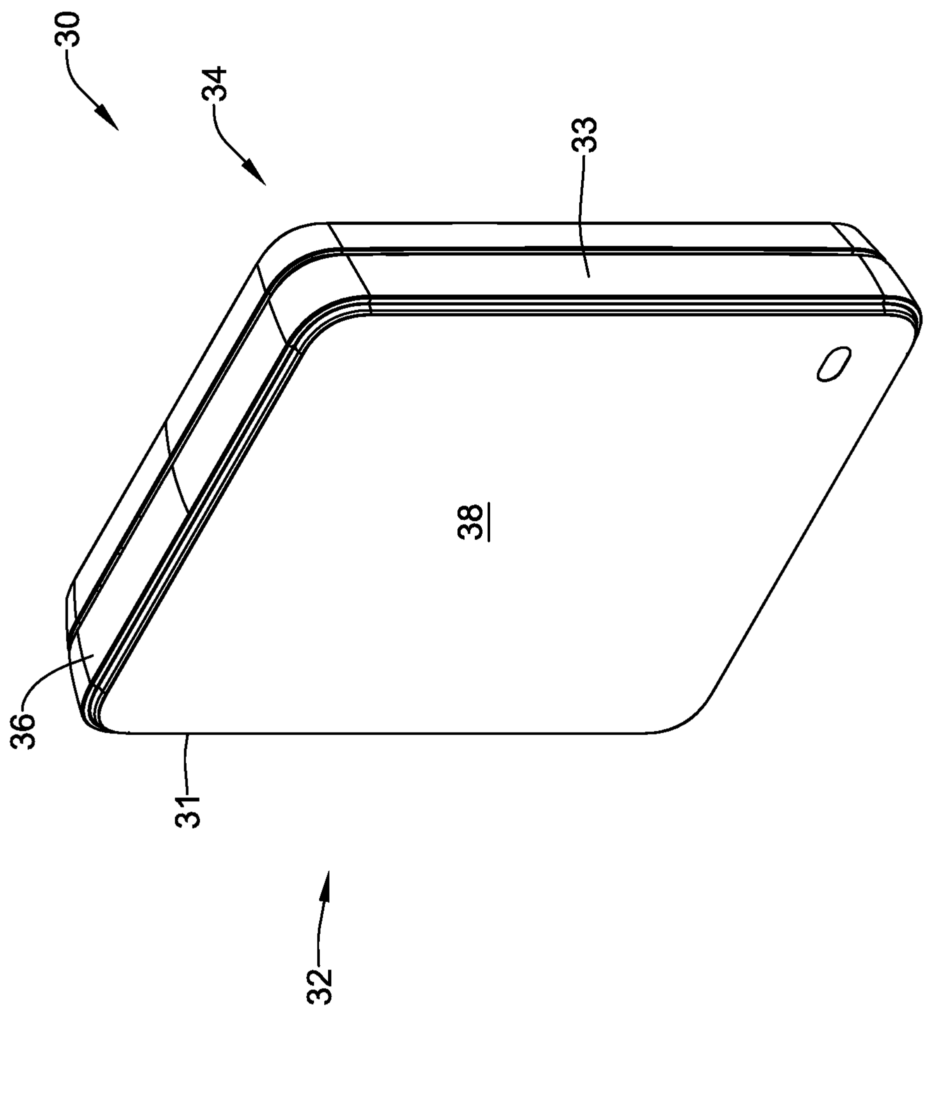
FIG. 2 is a perspective view of an illustrative building controller that may form a part of the illustrative building control system of FIG. 1.

FIG. 2 is a perspective view of an illustrative building controller 30. The illustrative building controller 30 may be considered as being an example of the building controller 12 illustrated in FIG. 1. The building controller 30 may be configured to control any of a variety of different building control components (such as the building control component 14 illustrated in FIG. 1). The building controller 30 may be a security controller. The building controller 30 may be a lighting controller. In some cases, the building controller 30 may be an HVAC controller, such as a wall mounted thermostat. The building controller 30 may be considered as having a front side 32 and a back side 34. The building controller 30 has a main body 36 that houses at least some of the electronics that form the building controller 30. For example, the main body 36 may house one or more circuit boards that are configured to provide the desired functionality to the building controller 30. The main body 36 may be considered as having a first side 31 and a second side 33. The main body 36 includes a front plate 38 that in some instances forms the outermost portion of the front side 32. The front plate 38 may accommodate or otherwise include a display such as a fixed segment Liquid Crystal Display (LCD) or a dot matrix LCD. The display may form a portion of the front plate 38. In some cases, the display is located behind the front plate 38, and at least a portion of the front plate 38 may be transparent in order to permit viewing of the display. In some cases, the front plate 38 includes an opening through which the display may be viewed. In some cases, the display may be a touch screen display, but this is not required.

Figure 3:
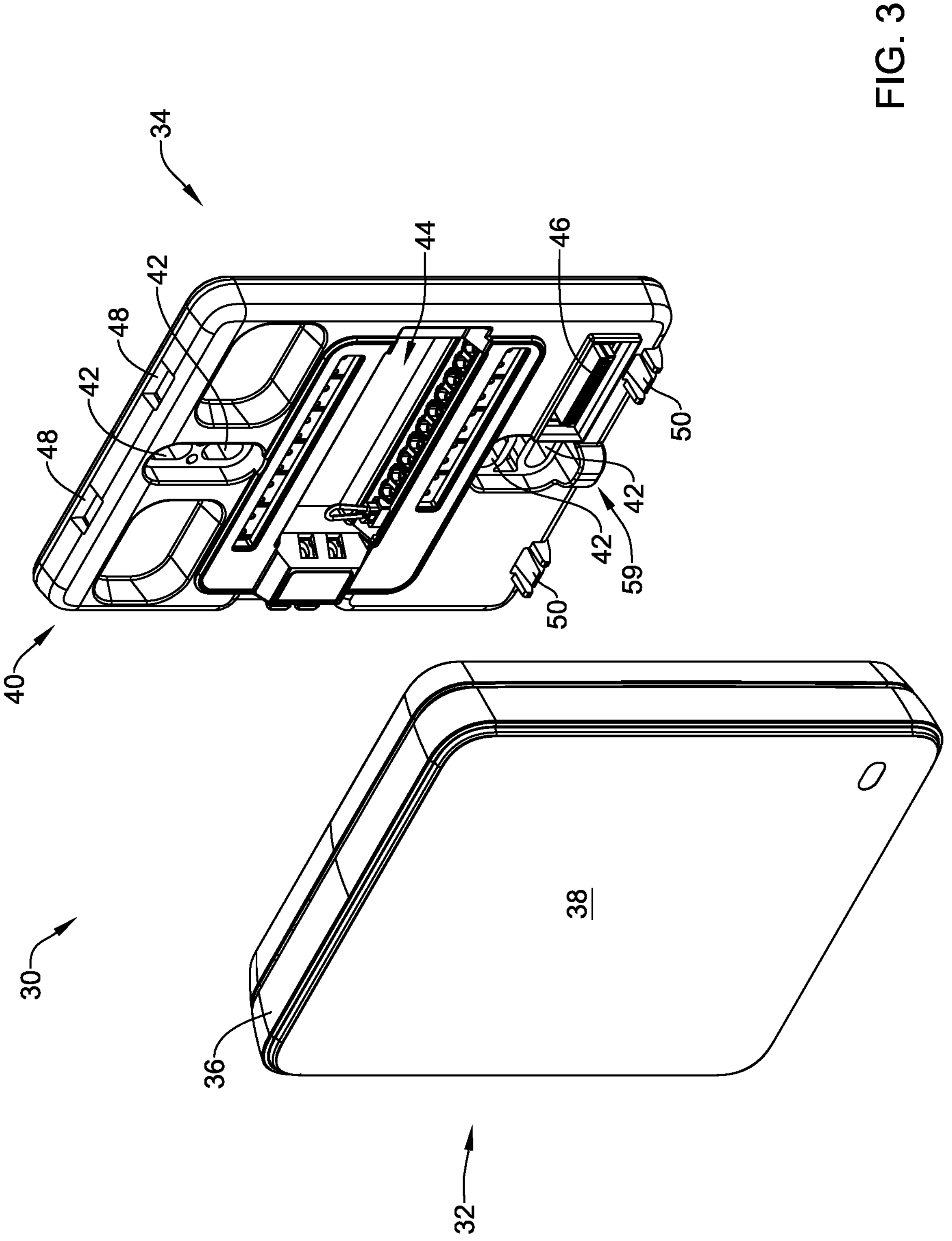
FIG. 3 is a partially exploded perspective view of the illustrative building controller of FIG. 2 including a back plate and a main body.

FIG. 3 is a partially exploded perspective view of the building controller 30 of FIG. 2, showing a back plate 40 that is not visible in FIG. 2. As will be appreciated, the back plate 40, when provided, is configured to be mountable to a wall or other vertical surface. Accordingly, the back plate 40 includes several mounting apertures 42 that are configured to accommodate an appropriate fastener such as a bolt or a screw that extends through each mounting aperture 42 and into the wall, a junction box on or in the wall, or other vertical surface. While described as a back plate, it will be appreciated that the back plate 40 may include one component or several components that are coupled together to form the back plate 40. For example, the back plate 40 may be configured to accommodate a number of field wires (not illustrated) in a wiring region 44. The wiring region 44 may permit electrical connection of the field wires to individual conductive traces that culminate in an electrical connector 46. As will be discussed, the main body 36 may include a corresponding electrical connector that is electrically connectable to the electrical connector 46 of the back plate 40 in order to provide desired electrical connections between the field wires (and the building control component 14 connected thereto) and the building controller 30.

Figure 3A:
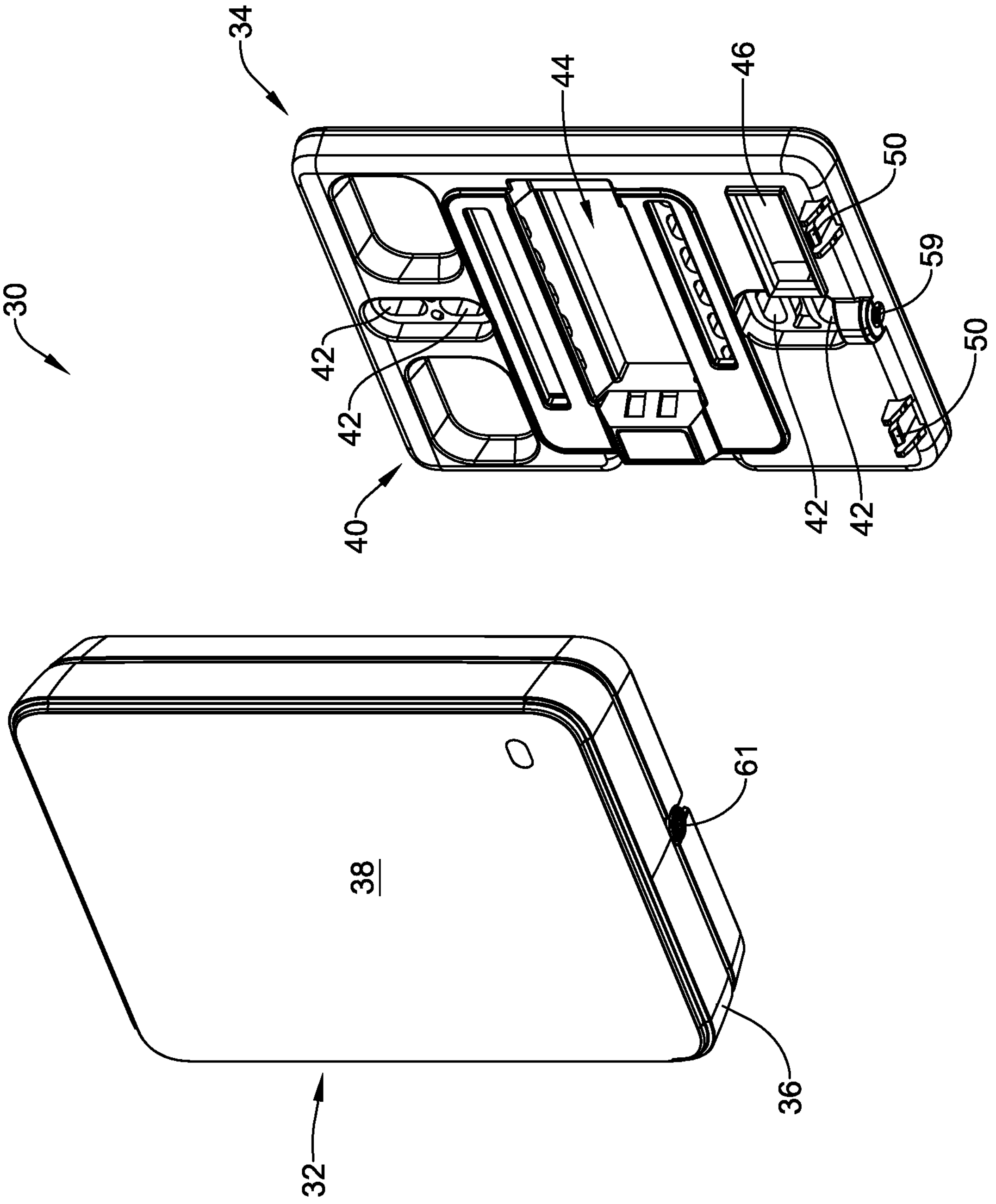
FIG. 3A is a partially exploded perspective view of the illustrative building controller of FIG. 2 including a back plate and a main body, shown from a different angle.

The illustrative back plate 40 also includes structures that enable the main body 36 to be releasably secured to the back plate 40. In the example shown, the back plate 40 includes a pair of securement apertures 48 along an upper side of the back plate 40 as well as a pair of securement latches 50 extending outwardly along a lower side of the back plate 40. As will be discussed, the illustrative main body 36 includes complementary structures that interact with the securement apertures 48 and the securement latches 50 in order to releasably secure the main body 36 to the back plate 40. In some instances, and as illustrated in FIG. 3A, a screw 61 may extend through an aperture formed in a lower side of the main body 36, and threadedly engage a corresponding threaded aperture 59 formed in a lower side of the back plate 40. The threaded aperture 59 may be or otherwise include a captive threaded nut, for example. Once the main body 36 is positioned relative to the back plate 40, the screw 61 may be placed to help secure the main body 36 to the back plate 40.

Figure 4:
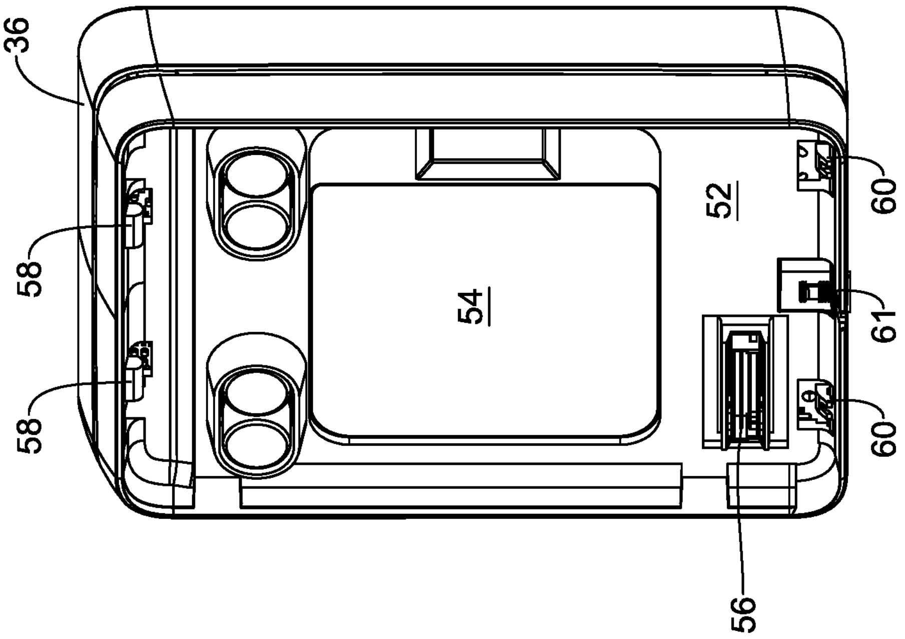
FIG. 4 is a rear perspective view of the main body as shown in FIG. 3.

FIG. 4 is a rear perspective view of the main body 36. It can be seen that the illustrative main body 36 defines a recess 52 that is dimensioned to accommodate some or all of the back plate 40. As a result, when assembled (as shown in FIG. 1), the illustrative main body 36 hides much or all of the back plate 40 from view, thereby providing a clean, streamlined appearance for the building controller 30. The illustrative main body 36 also defines a recess 54 that helps to accommodate the wiring region 44 of the back plate 40. An electrical connector 56 is configured and positioned to electrically couple with the electrical connector 46 of the back plate 40, thereby providing electrical connections to the building controller 30.

The illustrative main body 36 includes a first pair of mounting latches 58 that are disposed along an upper side of the recess 52 and that are configured to releasably engage the securement apertures 48 along the upper side of the back plate 40. The illustrative main body 36 also includes a second pair of mounting latches 60 that are disposed along a lower side of the recess 52 and that are configured to releasably engage the securement latches 50 along the lower side of the back plate 40. These are illustrative only, as any of a variety of different mechanical or frictional securement features may be used in releasably securing the main body 36 to the back plate 40 when a back plate 40 is provided. In some cases, the building controller 30 may include additional structure for securing the main body 36 to the back plate 40.

Figure 5:
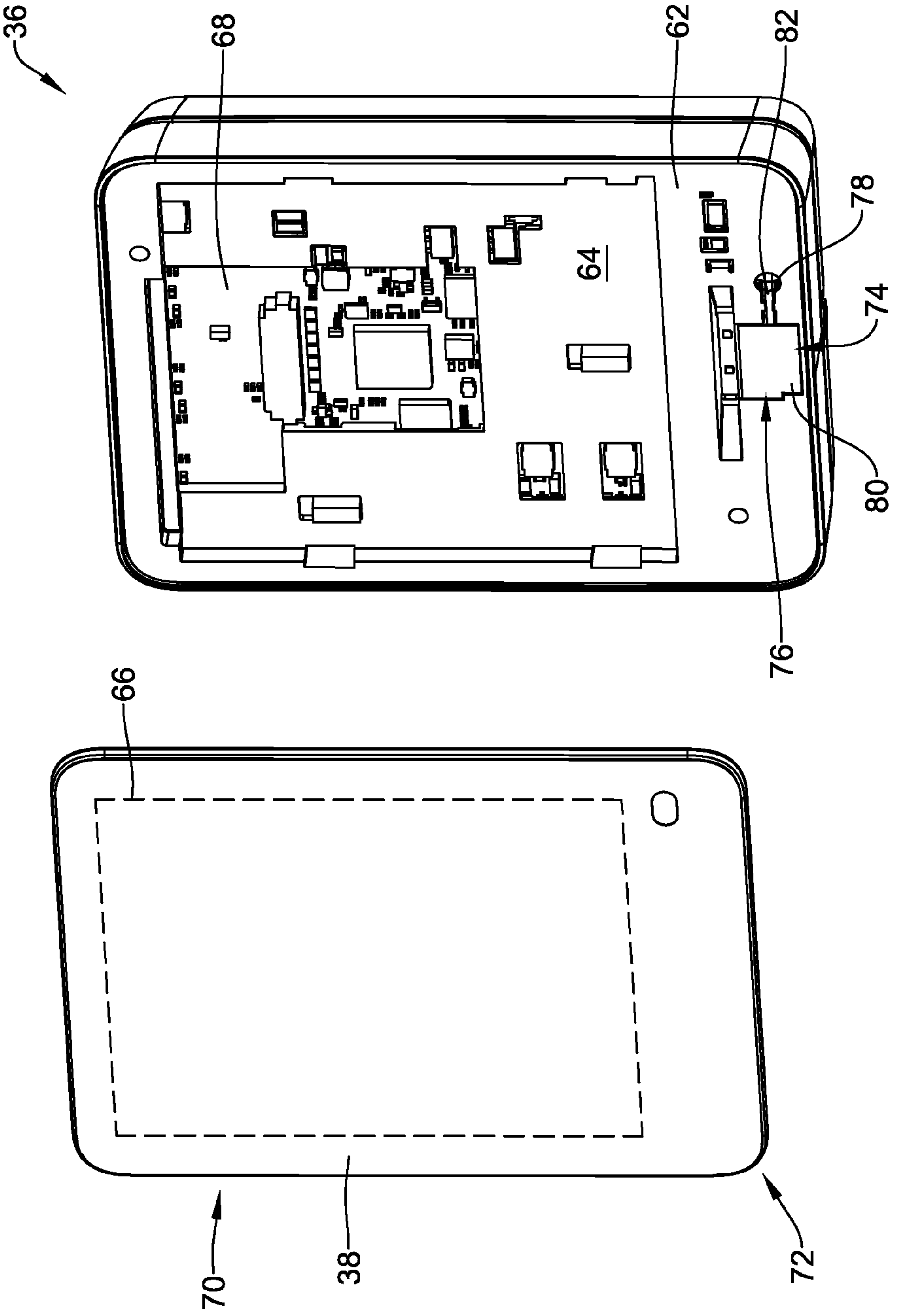
FIG. 5 is a partially exploded perspective view of the main body.

FIG. 5 is a partially exploded perspective view of the illustrative main body 36. In FIG. 5, the front plate 38 has been removed to expose a display holder 62. The display holder 62, which may also be considered as an intermediate structure of the main body 36, includes a display recess 64 that may be considered as accommodating at least part of a display 66, shown in phantom on the front plate 38. In some cases, the front plate 38 may be considered as including a transparent portion 70 and a non-transparent portion 72. The transparent portion 70 may overly at least a portion of the display 66 such that the display 66 is visible through the transparent portion 70. The non-transparent portion 72 may correspond to a region of the front plate 38 that does not overly the display 66. In the example shown, the display 66 may be considered as being disposed between the front plate 38 and the display holder 62. The non-transparent portion 72 may be considered as being laterally offset from the transparent portion 70. A portion of a printed circuit board (PCB) 68 is visible through the display holder 62. In some cases, double-faced tape or other adhesive may be used to secure the front plate 38 relative to the display holder 62, but this is only an example.

Figure 6:
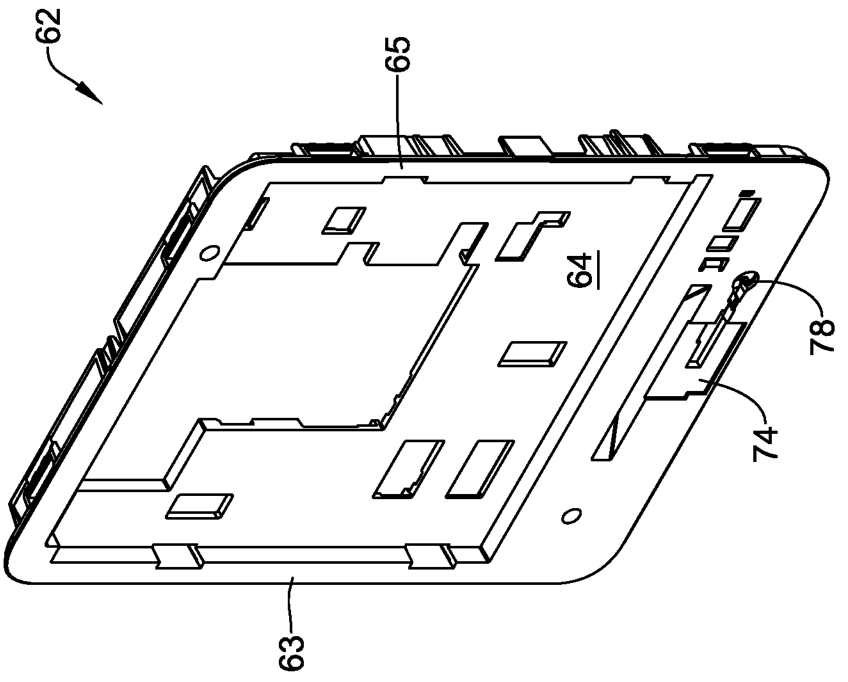
FIG. 6 is a perspective view of a portion of the main body.

The illustrative display holder 62 includes an antenna recess 74 that receives at least a portion of an antenna 76. FIG. 6, which is a perspective view of the display holder 62 by itself, better illustrates the antenna recess 74. In some instances, as shown, the antenna recess 74 includes an aperture 78 that permits the antenna 76 to pass through the display holder 62. In some cases, the antenna 76 may be considered as including a flexible printed circuit (FPC) 80 that fits at least partially into the antenna recess 74 and a connector cable 82 that extends from the FPC 80 and passes through the aperture 78 such that the connector cable 82 is able to be electrically connected to a connector on the PCB 68.

The illustrative display holder 62 includes a first side 63 and a second side 65. It will be appreciated that the first side 63 of the display holder 62 aligns with the first side 31 of the main body 36 and the second side 65 of the display holder 62 aligns with the second side 33 of the main body 36. In some cases, the antenna 76, or at least the FPC 80, is laterally spaced away from the first side 63 of the display holder 62, and hence is laterally spaced away from the first side 31 of the main body 36. In some cases, the antenna 76, or at least the FPC 80, is laterally spaced away from the second side 65 of the display holder 62, and hence is laterally spaced away from the second side 33 of the main body 36. In the example shown, the FPC 80 is disposed between the front plate 38 and the display holder 62.

Figure 7:
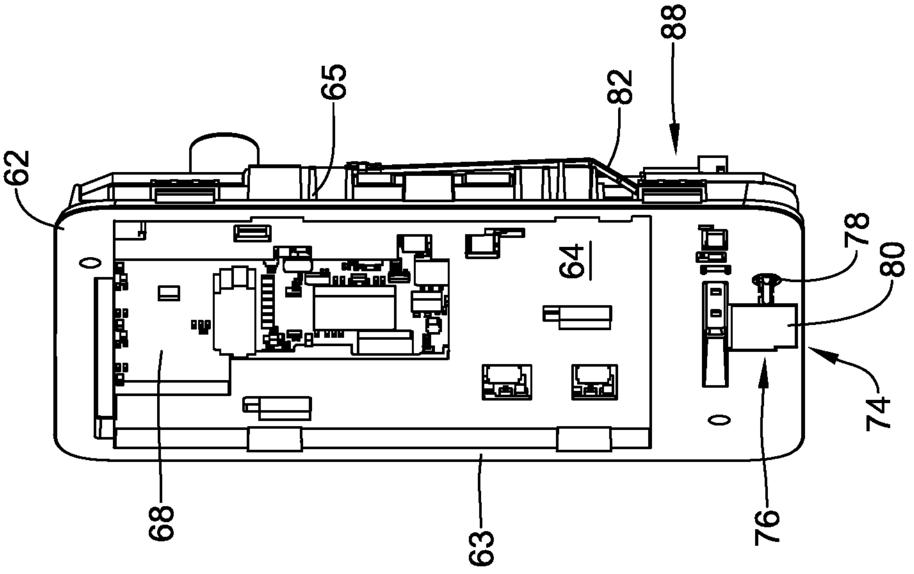
FIG. 7 is a perspective view of a portion of the main body.

FIG. 7 is a perspective view of a portion of the main body 36, showing the antenna 76 disposed relative to the display holder 62 and the PCB 68. The FPC 80 fits at least partially into the antenna recess 74 and the connector cable 82 extends through the aperture 78 and runs behind the PCB 68. In some cases, the display holder 62 includes a relief feature 88 that accommodates the connector cable 82 as the connector cable 82 extends from the aperture 78 towards a connection point on the back side of the PCB 68, as best shown in FIG. 8.

Figure 8:
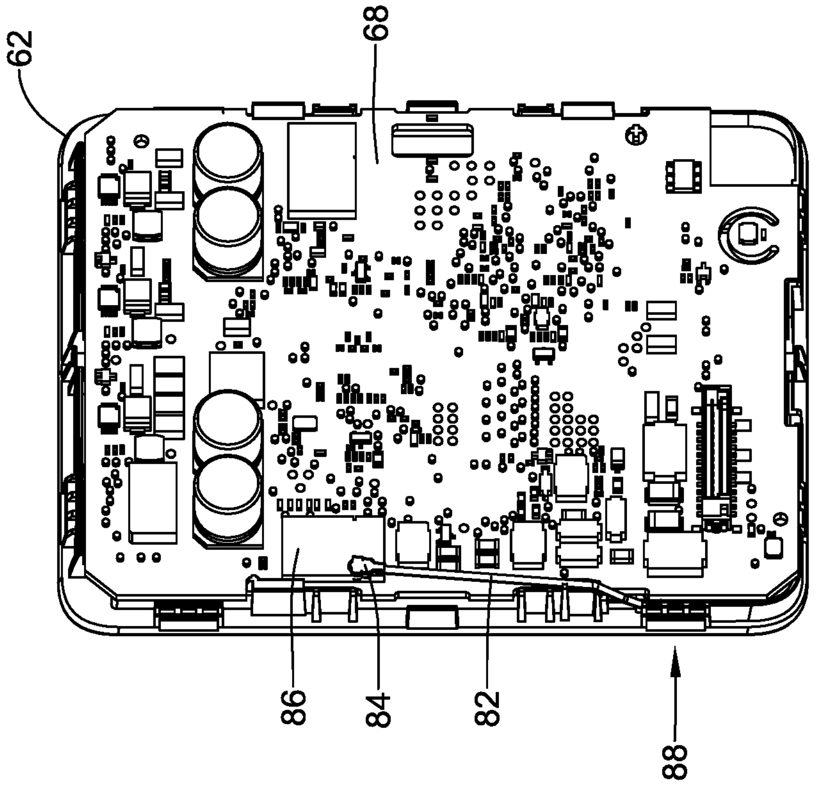
FIG. 8 is a back view of a portion of the main body.

FIG. 8 is a back view of a portion of the main body 36. As can be seen, the antenna 76 includes a connector 84 at a terminal end of the connector cable 82. In some instances, the connector 84 may be a coaxial connector, but this is not required in all cases. The connector 84 electrically couples the connector cable 82, and hence the FPC 80, to a connector 86. The connector 86 is disposed on the PCB 68, and connects the antenna to one or more electrical components on the PCB 68.

Figure 9:
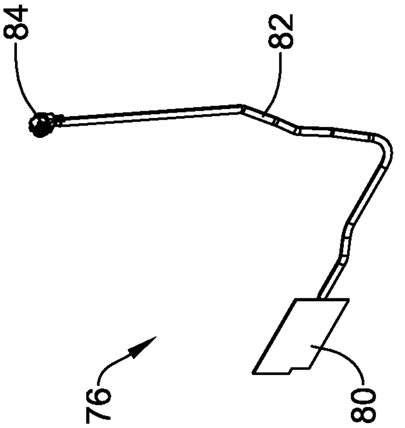
FIG. 9 is a perspective view of an illustrative antenna assembly usable in the illustrative building controller of FIG. 2.

FIG. 9 is a perspective view of the illustrative antenna 76. In some instances, the antenna 76 may be an off-the-shelf component. The antenna 76 may be specially manufactured for use in the building controller 12. The antenna 76 may be configured to enable the building controller 30 to communicate wirelessly over a wireless communication network such as but not limited to the first network 20 and/or the second network 24 as shown in FIG. 1.

In the example shown, the antenna 76 is fitted compactly within the structure of the building controller 12, and is also positioned toward the front of the building controller and away from the mounting wall. Positioned the antenna 76 away from the mounting wall may increase the range and/or signal-to-noise ratio of the wireless communication signals because the wall and/or other components in the wall such as metal junction boxes may attenuate or otherwise disturb the wireless signals. By position the antenna 76 away from the wall and/or other components in or on the wall, the wireless signals and thus wireless communication performance may be improved.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A wall module for a building control system, the wall module comprising:

a back plate with one or more mounting features for mounting the backplate to a wall;

a main body including one or more attachment features for removably attaching the main body to the back plate;

the main body including a front side and a back side, wherein at least part of the front side is formed by a front plate;

a display housed by the main body in a display cavity that is defined at least in part by the front plate, and wherein at least part of the display is viewable from the front side;

an antenna housed by the main body in an antenna cavity that is defined at least in part by the front plate;

a printed circuit board (PCB) housed by the main body, wherein the PCB is situated between the antenna cavity and the back side of the main body, and wherein the antenna is electrically coupled to the PCB via a connector cable; and a display holder serving as a mechanical interface between the PCB and the front plate, wherein the display holder comprises:

a display recess in a front side of the display holder to receive at least part of the display to position the display relative to PCB; and an antenna recess in the front side of the display holder for receiving at least part of the antenna to position the antenna relative to the PCB and the display.

2. The wall module of claim 1, wherein the front plate comprises a transparent portion and a non-transparent portion, wherein the at least part of the display is viewable through the transparent portion of the front plate and wherein the antenna is situated behind the non-transparent portion of the front plate.

3. The wall module of claim 1, wherein the front plate is a single piece.

4. The wall module of claim 1, wherein the antenna is on a flexible printed circuit (FPC).

5. The wall module of claim 1, wherein the display holder includes a relief feature that accommodates the connector cable to connect the antenna to the PCB.

6. The wall module of claim 1, wherein the antenna is configured to support communication over a wireless communications network.

7. The wall module of claim 1, wherein the display holder further includes a relief feature formed in the display holder that accommodates a connector cable as the connector cable extends from an aperture in the display holder toward a connection point on a back side of the PCB.

8. A wall module for a building control system, the wall module comprising:
a main body including a front side and a back side, wherein at least part of the front side is formed by a front plate;
a printed circuit board (PCB) housed by the main body;
a display housed by the main body, wherein at least part of the display is viewable from the front side;
an antenna housed by the main body, wherein the antenna includes a flexible printed circuit (FPC) that is positioned behind the front plate and in front of the PCB; and
a display holder serving as a mechanical interface between the PCB and the front plate, wherein the display holder comprises:
a display recess that receives at least part of the display to position the display relative to the PCB; and
an antenna recess for receiving at least part of the FPC of the antenna to position the FPC of the antenna behind the front plate.

9. The wall module of claim 8, wherein the antenna includes a connector cable that connects the FPC of the antenna to the PCB.

10. The wall module of claim 9, wherein the display holder includes a relief feature that accommodates the connector cable that connects the FPC of the antenna to the PCB.

11. The wall module of claim 8, wherein at least part of the antenna recess is defined by the front plate.

12. The wall module of claim 11, wherein at least part of the display recess is defined by the front plate.

13. The wall module of claim 12, wherein the front plate comprises a transparent portion and a non-transparent portion, wherein at least part of the display is viewable through the transparent portion of the front plate, and wherein the FPC of the antenna is situated behind the non-transparent portion of the front plate.

14. The wall module of claim 8, wherein the antenna recess is laterally offset from the display recess so that the FPC of the antenna is laterally offset from and does not overlap with the display.

15. The wall module of claim 8, wherein the main body includes one or more side walls that extend between the front side and the back side of the main body, and wherein the FPC of the antenna is spaced inward from each of the one or more side walls of the main body.

16. A wall mountable thermostat comprising:
a main body including a front side, a back side and one or more side walls extending between the front side and the back side;
a printed circuit board (PCB) housed by the main body;
a display housed by the main body, wherein at least part of the display is viewable from the front side of the main body;
an antenna housed by the main body, wherein the antenna:
is spaced from the PCB toward the front of the wall mountable thermostat and electrically connected to the PCB;
is spaced inward from each of the one or more side walls of the main body; and
is spaced laterally from the display;
wherein at least part of the front side of the main body is formed by a front plate, and wherein the main body further includes a spacer positioned between the antenna and the PCB and serving as a mechanical interface therebetween, wherein the spacer defines at least part of an antenna recess for receiving at least part of the antenna, and wherein at least part of the antenna recess is defined by the front plate of the main body.

17. The wall mountable thermostat of claim 16, wherein the front plate comprises a transparent portion and a non-transparent portion, wherein the at least part of the display is viewable through the transparent portion of the front plate and wherein at least part of the antenna is situated behind the non-transparent portion of the front plate.

18. The wall mountable thermostat of claim 16, wherein the antenna comprises a flexible printed circuit (FPC), and wherein the FPC is connected to the PCB by a connector cable.

* * * * *